United States Patent
Sun et al.

(10) Patent No.: US 11,364,494 B2
(45) Date of Patent: Jun. 21, 2022

(54) ARRAY TYPE PAPER CHIP FOR 2019-NCOV VIRUS HIGH-THROUGHPUT DETECTION AND MANUFACTURING METHOD OF ARRAY TYPE PAPER CHIP

(71) Applicant: Fuzhou University, Fuzhou (CN)

(72) Inventors: Hao Sun, Fuzhou (CN); Hui Dong, Fuzhou (CN); Yuan Jia, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 0 days.

(21) Appl. No.: 17/330,551

(22) Filed: May 26, 2021

(65) Prior Publication Data

US 2021/0283601 A1 Sep. 16, 2021

Related U.S. Application Data

(63) Continuation of application No. PCT/CN2020/139860, filed on Dec. 28, 2020.

(30) Foreign Application Priority Data

Feb. 10, 2020 (CN) .......................... 202010083700.7

(51) Int. Cl.
*B01L 3/00* (2006.01)
*B32B 7/12* (2006.01)
(Continued)

(52) U.S. Cl.
CPC ... *B01L 3/502707* (2013.01); *B01L 3/502753* (2013.01); *B23K 26/0093* (2013.01);
(Continued)

(58) Field of Classification Search
CPC ......... B01L 3/502707; B01L 3/502753; B01L 2300/126; B23K 26/0093; B32B 7/12;
(Continued)

(56) References Cited

U.S. PATENT DOCUMENTS

2015/0132742 A1* 5/2015 Thuo ................. B01L 3/502707
435/5
2019/0184393 A1* 6/2019 Mahmud ................ G01N 33/48

OTHER PUBLICATIONS

Kaur, N., Michael, J.S. & Toley, B.J. A modular paper-and-plastic device for tuberculosis nucleic acid amplification testing in limited-resource settings. Sci Rep 9, 15367 (Oct. 25, 2019). https://doi.org/10.1038/s41598-019-51873-8 (Year: 2019).*

(Continued)

*Primary Examiner* — Cynthia L Schaller
(74) *Attorney, Agent, or Firm* — WPAT, PC

(57) ABSTRACT

The invention relates to an array type paper chip for 2019-nCoV virus high-throughput detection and a manufacturing method of the array type paper chip. The array type paper chip comprises a glass substrate layer, a paper unit layer and a cell grid layer which are arranged in sequence from bottom to top, wherein the grid layer comprises N circular paper detection units with a diameter R being arranged in the form of an array; and the unit grids of the unit grid layer are in one-to-one correspondence to the paper detection units to separate the paper detection units. The array type paper chip is simple in structure, the manufacturing process is simple and stable, the finished products are stable, requirements on the processing environment and conditions are very low, and processing equipment is low in price. Moreover, the processing process does not revolve any chemical reagent, and therefore, the method is more environmentally friendly than methods such as ultraviolet lithography.

2 Claims, 2 Drawing Sheets

(51) Int. Cl.
  *B32B 9/06* (2006.01)
  *B32B 38/00* (2006.01)
  *B23K 26/00* (2014.01)
  *B32B 17/06* (2006.01)

(52) U.S. Cl.
  CPC ............... *B32B 7/12* (2013.01); *B32B 9/06* (2013.01); *B32B 17/065* (2013.01); *B32B 38/0004* (2013.01); *B01L 2300/126* (2013.01)

(58) Field of Classification Search
  CPC ..... B32B 9/06; B32B 17/065; B32B 38/0004; C12Q 1/701; C12Q 1/6844; C12Q 1/686
  See application file for complete search history.

(56) References Cited

OTHER PUBLICATIONS

3M(tm) Double Coated Tape 9731 Product Description (Jul. 2011) (Year: 2011).*

* cited by examiner

ARRAY TYPE PAPER CHIP FOR 2019-NCOV VIRUS HIGH-THROUGHPUT DETECTION AND MANUFACTURING METHOD OF ARRAY TYPE PAPER CHIP

CROSS REFERENCE TO RELATED APPLICATION

The invention relates to an array type paper chip for 2019-nCoV virus high-throughput detection and a manufacturing method of the array type paper chip.

BACKGROUND OF THE INVENTION

Microfluidic chip laboratory can realize the flexible combination and the scale integration of multiple unit technologies on a tiny controllable platform, has the advantages of simple operation and low cost, and can be used as an important supplement to instrument methods. Since the birth in the early 1990s, microfluidic chips developed by teams from various countries have been successfully used in the detection of SARS, H1N1, MERS, HIV, hepatitis and Ebola virus, and the diagnosis and treatment of related major infectious diseases. The paper microfluidic chip was originally proposed by G. Whitesides and other scholars from Harvard University in 2007. Generally, the conventional filter paper is used as the matrix material, and the self-driving of fluid is realized by the capillary fiber structure inside. The invention proposes a novel high-throughput array type paper chip compatible with multiple reactions such as polymerase chain reaction (a 95° C.-65° C.-25° C. three-stage circulating temperature control mode) and loop-mediated isothermal nucleic acid amplification (a 65° C. constant temperature mode). The objective of the invention is to provide a new way to alleviate the pressure of 2019-nCoV virus detection in China and support virus detection in areas where medical equipment is deficient. At the same time, the reserve technology is provided for diagnosis, treatment and prevention of major public health diseases in the future.

SUMMARY OF THE INVENTION

The objective of the invention is to provide an array type paper chip for 2019-nCoV virus high-throughput detection and a manufacturing method of the array type paper chip. The array type paper chip is simple in structure, the manufacturing process is simple and stable, the finished products are stable, requirements on the processing environment and conditions are very low, and processing equipment is low in price. Moreover, the processing process does not revolve any chemical reagent, and therefore, the method is more environmentally friendly than methods such as ultraviolet lithography.

To achieve the objective, the invention adopts the following technical scheme: the array type paper chip for 2019-nCoV virus high-throughput detection includes a glass substrate layer, a paper unit layer and a cell grid layer which are arranged in sequence from bottom to top. The grid layer includes N circular paper detection units with a diameter being R arranged in the form of an array; and the unit grids of the unit grid layer are in one-to-one correspondence to the paper detection units to separate the paper detection units.

In one embodiment of the invention, the glass layer and the paper unit layer are bonded by a highly-transparent adhesive layer.

In one embodiment of the invention, the highly-transparent adhesive layer is highly-transparent acrylic double-sided adhesive.

In one embodiment of the invention, the paper unit layer adopts Whatman Grade 1 qualitative filter paper.

In one embodiment of the invention, the volume of the circular paper detection unit is 0.3-0.5 μl.

The invention further provides a manufacturing method for an array type paper chip for 2019-nCoV virus high-throughput detection, including the following steps: bonding the paper unit layer with the glass substrate layer through the highly-transparent adhesive layer, and then adopting a digital laser engraving/cutting machine to integrate laser cutting with cladding of acrylic mucosa for processing, completing the chip design by flat vector diagram design software and importing the chip design into a user interface of a laser cutting machine, optimizing and determining the process parameters of the motion speed, working power and motion trajectory of a laser device according to the equipment and the environment, and obtaining N circular paper detection units with the diameter being R arranged in the form of the array on the glass substrate layer. Similarly, the unit grid layer is processed by the same processing method, and the unit grids of the unit grid layer are in one-to-one correspondence to the paper detection units to isolate the paper detection units to obtain needed array type paper chips.

Compared with the prior art, the invention has the following beneficial effects:

1. improve diagnosis efficiency: the inherent larger specific surface area of the fiber structure inside the array type paper d chip filter paper provides a natural condition for improving the biochemical reaction strength per unit volume/time, and the method is beneficial for obtaining low abundance sample information in principle within shorter time; at the same time, the chip detection throughput can be flexibly designed according to needs, and single analysis can provide tens to thousands of pieces of sample information, so that efficiency of clinical diagnosis can be greatly improved.

2. reduce test cost: in terms of reagent consumption, the reaction volume of the filter paper chip detection unit is usually at or below the submicron upgrade, far lower than the reagent consumption in the conventional reaction tube (more than 20 μl); in terms of instrument cost, the cost of the paper chip can be as low as RMB 1, detection technology of the paper chip can be independent of commercial equipment, avoiding dependence on expensive instruments, especially imported equipment with a price of millions of yuan.

3. avoid tedious operations: the filter paper chip does not introduce complex energy, optical, electronic and mechanical systems of the instrument, and does not involve technical requirements such as equipment operation and maintenance, which greatly simplifies the experimental process and operation difficulty.

4. simplify the reaction dimension: precise temperature control is a necessary condition for in-vitro nucleic acid amplification reaction; conventional PCR or LAMP temperature control is generally achieved by a desktop-level temperature control box or a built-in heating/cooling pool; the heat transfer process is in multiple directions, nucleic acid amplification is in a three-dimensional volume, the material of the reaction tube is generally polypropylene with ordinary thermal conductivity; the heat transfer process of the paper chip is unidirectional, the nucleic acid amplification can be regarded as in the plane of the two-dimensional paper layer, the thermally conductive material can be flexibly assembled, and the temperature control response is more accurate.

Figure 1:
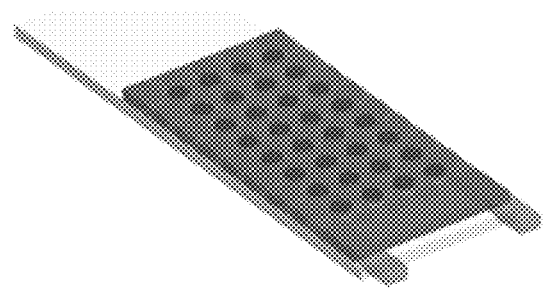
FIG. 1 shows the structure of the paper chip of the invention.

Description of reference characters: 1, glass substrate layer; 2, highly-transparent adhesive layer; 3, paper unit layer; 4, unit grid layer.

DETAILED DESCRIPTION OF THE PREFERRED EMBODIMENTS

The technical solution of the invention will be described in detail below with reference to the drawings.

The invention provides an array type paper chip for 2019-nCoV virus high-throughput detection, which includes a glass substrate layer 1, a paper unit layer 3 and a unit grid layer 4 which are arranged in sequence from bottom to top, wherein the paper unit layer 3 includes N number of circular paper detection units with a diameter of R, and the N number of circular paper detection units are arranged in of an array; and unit grids of the unit grid layer 4 are in one-to-one correspondence to the circular paper detection units to separate the circular paper detection units; the glass substrate layer 1 and the paper unit layer 3 are bonded by the highly-transparent adhesive layer 2; the highly-transparent adhesive layer 2 is highly-transparent acrylic double-sided adhesive; the paper unit layer 3 adopts Whatman Grade 1 qualitative filter paper; and the volume of the circular paper detection unit is 0.3-0.5 µl.

The invention provides a manufacturing method for array type paper chip for 2019-nCoV virus high-throughput detection, including the following steps: bonding the paper unit layer with the glass substrate layer through the highly-transparent adhesive layer, and then adopting a digital laser engraving/cutting machine to integrate laser cutting and cladding of acrylic mucosa for processing, completing the chip design by flat vector diagram design software and importing the chip design into a user interface of a laser cutting machine, optimizing and determining the process parameters of the motion speed, working power and motion trajectory of a laser according to the equipment and the environment, and obtaining N circular paper detection units with the diameter being R arranged in the form of the array on the glass substrate layer. Similarly, the unit grid layer is processed by the same processing method, and the unit grids of the unit grid layer are in one-to-one correspondence to the paper detection units to isolate the paper detection units to obtain needed array type paper chips.

The following is a specific implementation process of the invention. The invention proposes an array type paper chip for 2019-nCoV virus high-throughput detection, which is a novel high-throughput array type paper chip compatible with multiple reactions such as polymerase chain reaction (a 95° C.-65° C.-25° C. three-stage circulating temperature control mode) and loop-mediated isothermal nucleic acid amplification (a 65° C. constant temperature mode).

Figure 2:
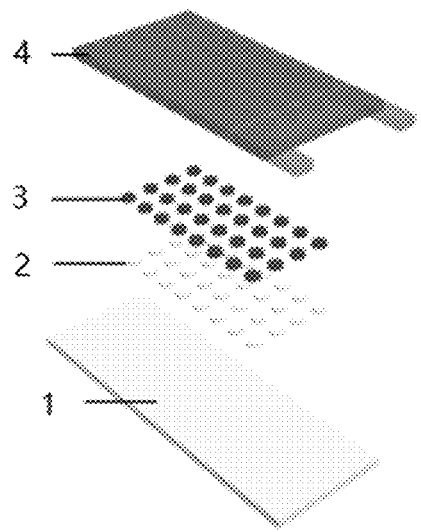
FIG. 2 is a schematic diagram of the structure design of the paper chip of the invention.

The chip design process of the invention is as follows:

Considering the portability of hand-held operation and observation as well as the subsequent packaging and transportation, the chip substrate is selected as a universal slide with the overall appearance size of 25×75 mm. The paper substrate material selects Whatman Grade 1 qualitative filter paper, 32 circular paper detection units with the diameter being 3 mm are arranged in 4 rows and 8 columns, the paper unit and the glass substrate are bonded by highly-transparent acrylic double-sided adhesive (thickness being 0.1 mm). The theoretical volume of the reaction unit is about 0.67 µl, and the actual usable volume is 0.3 to 0.5 µl. Using the same design concept, the chip detection throughput can be further expanded. This design scheme greatly improves the detection capabilities of existing similar paper chips. For the first time, the detection throughput of paper-d chips is matched with the conventional porous plate array, which is the first time in the field. The circular paper detection units are separated by a black grid structure, which can effectively block cross-interference of samples between the units and reduce background noises during fluorescence observation. The chip structure is as shown in FIG. 1 and FIG. 2.

The chip of the invention is manufactured as follows:

In view of the array chip design of the invention, a new process is independently proposed here, which integrates laser cutting of filter paper with cladding of acrylic mucosa to obtain dozens of detection units on a conventional glass slide at one time. The cost of a single paper-d chip consumable is as low as RMB 0.8, and the processing cycle is about 3 minutes per piece. After debugging the processing parameters, the chip yield is close to 100%. This process has the advantages of being simple and fast, obtaining stable finished products, and the like, has very low requirements on processing environment and conditions, and is low in equipment price. Moreover, the processing process does not involve any chemical reagents and is more environmentally friendly than methods such as ultraviolet lithography.

Figure 3:
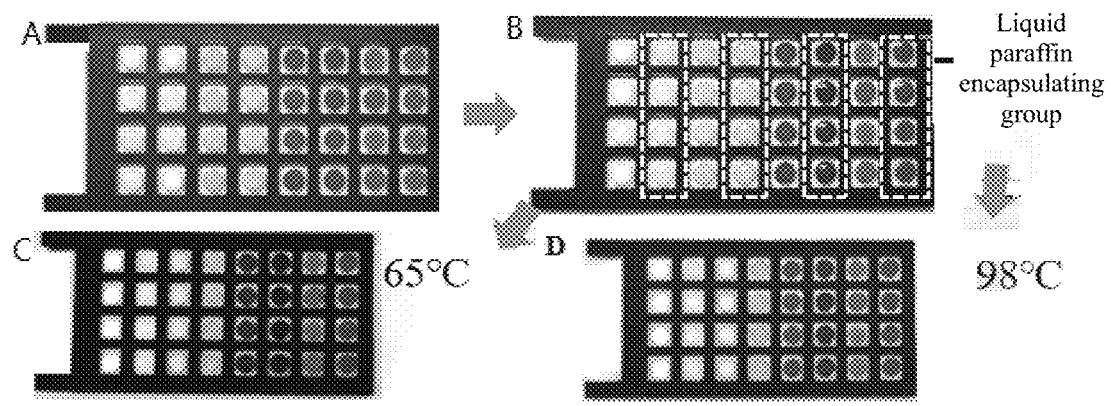
FIG. 3 shows the evaporation inhibition test of the temperature control reaction reagent of the paper chip of the invention, where, A) pure water on the chip and 3 kinds of hydrophilic ink droplets at the room temperature; B) pure water subjected to liquid sealing at the room temperature and 3 kinds of hydrophilic ink solutions; C) paper chip in a 65° C. hot plate heating test; D) paper chip in a 98° C. hot plate heating test.

The liquid seal of the chip reaction area of the invention:

The temperature affects the enzyme activity in the nucleic acid reaction reagent and directly determines whether or not the nucleic acid amplification is effective. Both microfluidic droplet-type digital PCR and continuous current-carrying PCR need to verify the problems of reagent evaporation and molecular adsorption on the surface of the polymer structure under high temperature heating conditions before the experiment. The invention adopts colorless, transparent and chemically-inert paraffin droplets to seal the circular paper reaction unit, and the liquid sealing effect is tested (FIG. 3). The test shows that the ink solution or pure water (0.5 µl) in the paper unit without liquid sealing treatment is completely evaporated after being heated on a hot plate at 65° C. for 20 minutes; the pure water in the reaction unit after paraffin liquid sealing treatment (dashed frame) or the ink remained to be in a liquid state after being heated on a 65° C. hot plate for 60 minutes (or 95° C. hot plate for 45 minutes), which proves the engineering reliability of the liquid sealing method in the chip reaction zone.

Figure 4:
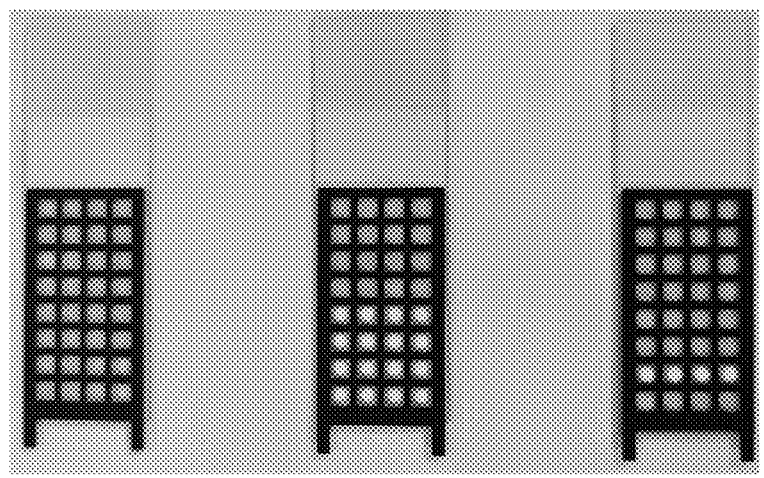
FIG. 4 is a chip prototype in the nucleic acid reaction test.

The chip prototype in the nucleic acid reaction test is as shown in FIG. 4. The array type paper chip of the invention has the following advantages:

1. improve diagnosis efficiency: the inherent larger specific surface area of the fiber structure inside the array type paper d chip filter paper provides a natural condition for improving the biochemical reaction strength per unit volume/time, and the method is beneficial for obtaining low abundance sample information in principle within shorter time; at the same time, the chip detection throughput can be flexibly designed according to needs, and single analysis can provide tens to thousands of pieces of sample information, so that efficiency of clinical diagnosis can be greatly improved.

2. reduce test cost: in terms of reagent consumption, the reaction volume of the filter paper chip detection unit is usually at or below the submicron upgrade, far lower than the reagent consumption in the conventional reaction tube (more than 20 µl); in terms of instrument cost, the cost of the paper chip can be as low as RMB 1, detection technology of the paper chip can be independent of commercial equipment, avoiding dependence on expensive instruments, especially imported equipment with a price of millions of yuan.

3. avoid tedious operations: the filter paper chip does not introduce complex energy, optical, electronic and mechanical systems of the instrument, and does not involve technical requirements such as equipment operation and maintenance, which greatly simplifies the experimental process and operation difficulty.

4. simplify the reaction dimension: precise temperature control is a necessary condition for in-vitro nucleic acid amplification reaction; conventional PCR or LAMP temperature control is generally achieved by a desktop-level temperature control box or a built-in heating/cooling pool; the heat transfer process is in multiple directions, nucleic acid amplification is in a three-dimensional volume, the material of the reaction tube is generally polypropylene with ordinary thermal conductivity; the heat transfer process of the paper chip is unidirectional, the nucleic acid amplification can be regarded as in the plane of the two-dimensional paper layer, the thermally conductive material can be flexibly assembled, and the temperature control response is more accurate.

The above are the preferred embodiments of the invention. Any changes made according to the technical solutions of the invention do not exceed the scope of the technical solutions of the invention.

What is claimed is:

1. A manufacturing method for an array type paper chip for 2019-nCoV virus high-throughput detection, comprising:
    bonding a paper unit layer with a glass substrate layer through a transparent adhesive layer;
    after the bonding, using a digital laser engraving/cutting machine to perform laser cutting to the paper unit layer and perform laser cladding to the transparent adhesive layer, thereby obtaining a processed transparent adhesive layer and N number of circular paper detection units with a same diameter arranged in an array on the glass substrate layer, wherein the processed transparent adhesive layer comprises N number of separate units arranged in an array and respectively bonded between the N number of circular paper detection units and the glass substrate layer; and
    using the digital laser engraving/cutting machine to perform another laser cutting to a unit grid layer to obtain unit grids of the unit grid layer, and making the unit grids and the N number of circular paper detection units be correspondingly disposed one by one, thereby isolating the N number of circular paper detection units from one another to obtain the array type paper chip;
    wherein the array type paper chip comprises the glass substrate layer, the processed transparent adhesive layer, the paper unit layer with the N number of circular paper detection units, and the unit grid layer with the unit grids, which are arranged in sequence from bottom to top;
    wherein the transparent adhesive layer is a transparent acrylic double-sided adhesive;
    wherein the paper unit layer comprises a qualitative filter paper;
    wherein a volume of each of the N number of circular paper detection units is in a range from 0.3 microliters (µl) to 0.5 µl; and
    wherein one or more of the N number of circular paper detection units are sealed by paraffin droplets during the 2019-nCoV virus high-throughput detection.

2. A manufacturing method for an array type paper chip for 2019-nCoV virus detection, comprising:
    bonding a paper unit layer including a qualitative filter paper to a glass substrate layer through a transparent double-sided adhesive layer;
    processing the paper unit layer and the transparent double-sided adhesive layer by a digital laser engraving/cutting machine to obtain processed paper unit layer and processed transparent double-sided adhesive layer respectively, wherein the processed paper unit layer comprises N number of circular paper detection units arranged in an array on the glass substrate layer, the processed transparent double-sided adhesive layer comprises N number of separate units arranged in an array and respectively bonded between the N number of circular paper detection units and the glass substrate layer; and
    processing a unit grid layer by a digital laser engraving/cutting machine to obtain a processed unit grid layer with unit grids; and
    arranging the unit grids of the processed unit grid layer to be in one-to-one correspondence to the N number of circular paper detection units to isolate the N number of circular paper detection units from one another and thereby obtain the array type paper chip;
    wherein the array type paper chip comprises the glass substrate layer, the processed transparent double-sided adhesive layer, the processed paper unit layer, and the processed unit grid layer arranged in sequence from bottom to top.

* * * * *